United States Patent
Kumar et al.

(10) Patent No.: US 11,082,515 B2
(45) Date of Patent: Aug. 3, 2021

(54) TECHNOLOGIES FOR OFFLOADING DATA OBJECT REPLICATION AND SERVICE FUNCTION CHAIN MANAGEMENT

(71) Applicant: Intel Corporation, Santa Clara, CA (US)

(72) Inventors: Dinesh Kumar, Beaverton, OR (US); Nrupal R. Jani, Hillsboro, OR (US); Ren Wang, Portland, OR (US); Christian Maciocco, Portland, OR (US); Sanjeev Jain, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 14/866,891

(22) Filed: Sep. 26, 2015

(65) Prior Publication Data

US 2017/0094002 A1 Mar. 30, 2017

(51) Int. Cl.
*H04L 29/08* (2006.01)
*H04L 12/825* (2013.01)
(Continued)

(52) U.S. Cl.
CPC .......... *H04L 67/2804* (2013.01); *H04L 47/26* (2013.01); *H04L 49/70* (2013.01);
(Continued)

(58) Field of Classification Search
CPC ......... H04L 47/33; H04L 49/25; H04L 45/74; H04W 88/16
See application file for complete search history.

(56) References Cited

U.S. PATENT DOCUMENTS

2007/0168336 A1* 7/2007 Ransil .................. G06F 16/958
2009/0157457 A1* 6/2009 Huuhtanen .......... G06Q 10/063
705/7.11
(Continued)

FOREIGN PATENT DOCUMENTS

CN 103346914 A 10/2013
CN 104243205 12/2014
(Continued)

OTHER PUBLICATIONS

International Search Report for PCT/US16/048847, dated Nov. 28, 2016 (3 pages).
(Continued)

*Primary Examiner* — Jael M Ulysse
(74) *Attorney, Agent, or Firm* — Barnes & Thornburg LLP

(57) ABSTRACT

Technologies for offloading data object replication and service function chain management include a switch communicatively coupled to one or more computing nodes capable of executing virtual machines and storing data objects. The switch is configured to determine metadata of a service function chain, transmit a network packet to a service function of the service function chain being executed by one or more of the computing nodes for processing the network packet. The switch is further configured to receive feedback from service function, update the metadata based on the feedback, and transmit the network packet to a next service function of the service function chain. Additionally or alternatively, the switch is configured to identify a plurality of computing nodes (i.e., storage nodes) at which to store a received data object, replicate the data object based on the number of storage nodes, and transmit each of the received data object and replicated data object(s) to different corre-
(Continued)

sponding storage nodes. Other embodiments are described and claimed.

24 Claims, 8 Drawing Sheets

(51) Int. Cl.
*H04L 12/931* (2013.01)
*H04L 12/725* (2013.01)

(52) U.S. Cl.
CPC .......... *H04L 67/10* (2013.01); *H04L 67/1095* (2013.01); *H04L 67/1097* (2013.01); *H04L 67/2809* (2013.01); *H04L 67/2838* (2013.01); *H04L 67/2861* (2013.01); *H04L 45/306* (2013.01); *H04L 67/327* (2013.01)

(56) References Cited

U.S. PATENT DOCUMENTS

| | | | |
|---|---|---|---|
| 2010/0250775 A1* | 9/2010 | Nidumolu | H04L 67/16 709/236 |
| 2011/0158237 A1* | 6/2011 | McDysan | H04L 67/16 370/392 |
| 2011/0169523 A1 | 7/2011 | Atrash et al. | |
| 2012/0330954 A1* | 12/2012 | Sivasubramanian | G06F 16/2228 707/737 |
| 2013/0110782 A1* | 5/2013 | McBrearty | G06F 16/273 707/640 |
| 2013/0163594 A1 | 6/2013 | Sharma et al. | |
| 2013/0272305 A1* | 10/2013 | Lefebvre | H04L 47/24 370/392 |
| 2013/0318276 A1 | 11/2013 | Dalal | |
| 2014/0140213 A1* | 5/2014 | Raleigh | H04L 67/2804 370/235 |
| 2014/0341029 A1* | 11/2014 | Allan | H04L 47/125 370/235 |
| 2014/0362857 A1* | 12/2014 | Guichard | H04L 45/566 370/392 |
| 2015/0003453 A1* | 1/2015 | Sengupta | H04L 45/74 370/392 |
| 2015/0071285 A1* | 3/2015 | Kumar | H04L 45/306 370/392 |
| 2015/0092551 A1* | 4/2015 | Moisand | H04L 12/4633 370/235 |
| 2015/0195197 A1* | 7/2015 | Yong | H04L 45/74 370/392 |
| 2015/0277969 A1* | 10/2015 | Strauss | G06F 9/466 707/703 |
| 2015/0278243 A1* | 10/2015 | Vincent | G06F 16/182 707/634 |
| 2015/0333930 A1* | 11/2015 | Aysola | H04L 63/0471 370/392 |
| 2015/0365324 A1* | 12/2015 | Kumar | H04L 12/4641 370/392 |
| 2015/0381493 A1* | 12/2015 | Bansal | H04L 45/30 370/392 |
| 2016/0028640 A1* | 1/2016 | Zhang | H04L 45/306 370/389 |
| 2016/0085577 A1* | 3/2016 | Gray | G06F 9/544 718/1 |
| 2016/0173373 A1* | 6/2016 | Guichard | H04L 45/74 370/392 |
| 2016/0248685 A1* | 8/2016 | Pignataro | H04L 47/2441 |
| 2017/0005920 A1* | 1/2017 | Previdi | H04L 45/306 |

FOREIGN PATENT DOCUMENTS

| | | |
|---|---|---|
| CN | 104506637 A | 4/2015 |
| KR | 10-1527377 | 6/2015 |
| WO | 2015073190 | 5/2015 |

OTHER PUBLICATIONS

Written Opinion for PCT/US16/048847, dated Nov. 28, 2016 (7 pages).
Extended European search report in European patent application No. 16849303.9, dated May 7, 2019 (12 pages).
Halpern J et al: "Service Function Chaining (SFC) Architecture; draft-ietf-sfc-architecture-ll.txt", Draft-Ietf-Sfc-Architecture-11.txt; Internet-Draft: Network Working Group, Internet Engineering Task Force, IETF; Standardworkingdraft, Internet Society (ISOC) 4, Rue Des Falaises CH-1205 Geneva, Switzer, No. 11, Jul. 24, 2015, pp. 1-30.
Chinese Office action in Chinese patent application No. 201680049724.2, dated Aug. 25, 2020, including machine translation (19 pages).
Chinese and English translation of Notice of Allowance for Chinese Patent Application No. 201680049724.2, dated Mar. 2, 2021, 8 pages.

* cited by examiner

TECHNOLOGIES FOR OFFLOADING DATA OBJECT REPLICATION AND SERVICE FUNCTION CHAIN MANAGEMENT

BACKGROUND

Network operators and communication service providers typically rely on complex, large-scale computing environments, such as high-performance computing (HPC) and cloud computing environments. Such cloud computing environments can provide cost-effective and scalable resources that can share platform resources for applications, network services, and storage using commodity compute and storage components. However, certain support functionality, such as implementing redundant storage objects in a storage node cluster, while providing improved performance capabilities and data recovery, can introduce latencies for write operations when storing large amounts of data (i.e., resulting from the creation and maintenance of the redundant copies across multiple storage nodes of the storage node cluster). Similarly, certain operations, such as network services of a service function chain (SFC) that are typically run inside a container or virtual machine (VM) in virtualized environment, while providing scalability to match traffic demands and reduce operational costs, can introduce performance issues as loads increase the amount of processing and intelligence needed to be collected to dynamically select and apply the set of network services of the SFC.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
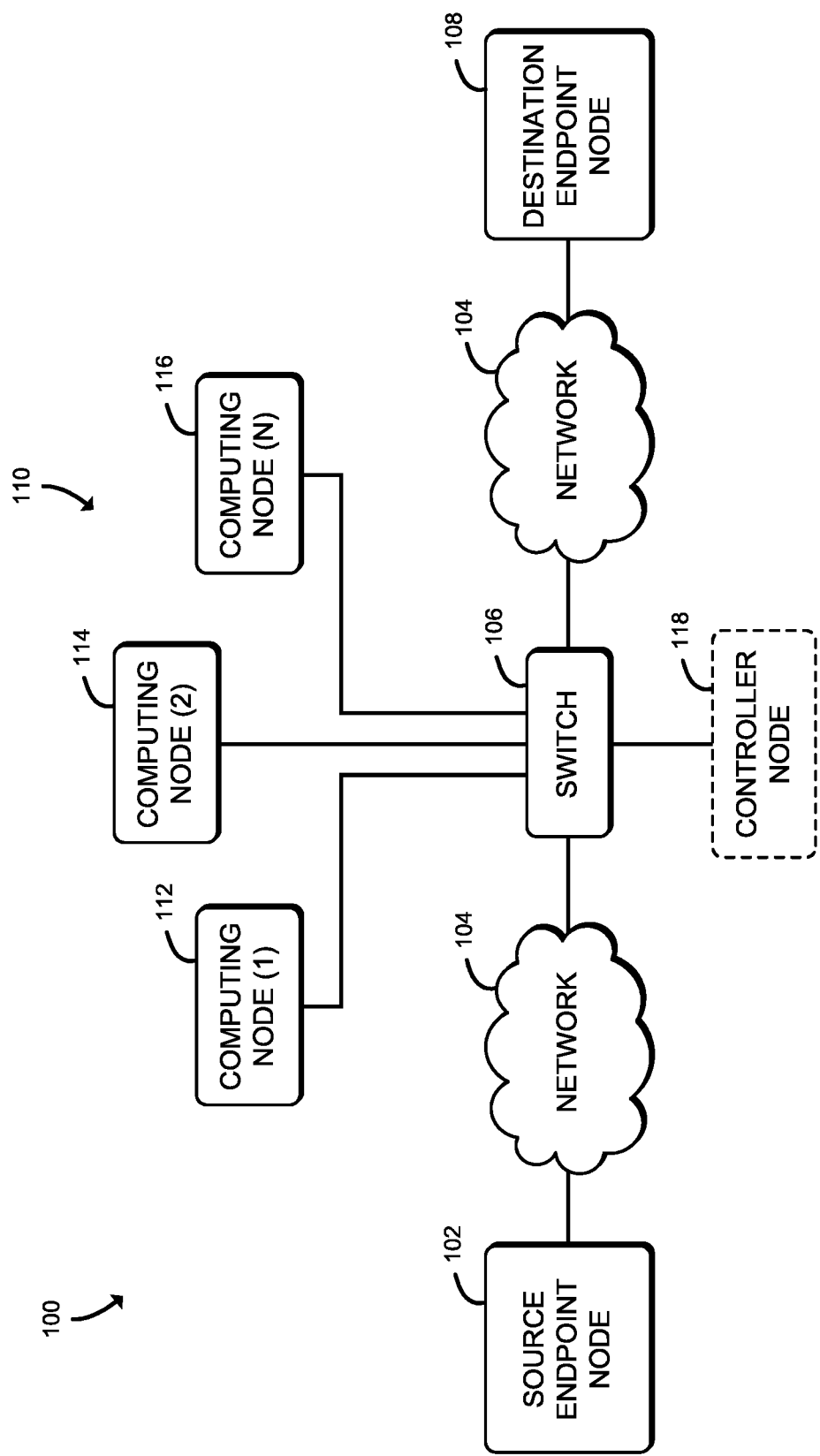
FIG. 1 is a simplified block diagram of at least one embodiment of a system for offloading data object replication and service function chain management that includes a set of compute nodes communicatively coupled to a switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for offloading data object replication and service function chain management includes a source endpoint node 102 and a destination endpoint node 108 communicatively coupled over a network 104 through a switch 106. As shown, the switch 106 is further communicatively coupled to a cluster of computing nodes 110 (e.g., compute and/or storage nodes) capable of storing objects (e.g., redundant backups) and/or performing one or more network packet processing functions (i.e., network services).

In use, the source endpoint node 102 transmits a network packet (i.e., via the network 104) that is intended to be received by a target computing node (e.g., one or more of the computing nodes 110, the destination endpoint node 108, etc.). For example, the network packet may include a data object to be replicated and stored at one or more of the computing nodes 110. Accordingly, the switch 106 can receive the data object, replicate the data object, and transmit the replicated data objects to a subset of the identified computing nodes 110 on which the replicated objects are to be stored.

However, unlike conventional technologies (i.e., switches without hardware offload support for flow/object replication), wherein the replication and forwarding of the data object is performed at each of the computing nodes 110 identified to store the data object, the switch 106 is configured to support hardware offload for flow/object replication. As such, the switch 106 can perform the data object replication and update a portion (e.g., a header) of the network packet for each of the identified computing nodes 110. In other words, the work (e.g., establishing connections between the computing nodes on which to store the data object, replicating the data object, transferring the data object between the computing nodes, etc.) can be offloaded to the switch 106, thereby removing the latency and overhead associated with the conventional technologies.

In another example, the network packet may be received by the switch 106 and require processing of the network packet to be performed prior to being transmitted to a target computing node (e.g., the destination endpoint node 108). To do so, virtualized service functions (i.e., network services, network functions, etc.), such as firewall services, network address translation (NAT) services, load-balancing services, deep packet inspection (DPI) services, intrusion detection and/or prevention system (IDS/IPS) services, encapsulation services, transmission control protocol (TCP) optimization services, encryption/decryption services, and/or other processing services, can be dynamically chained together to form a service function chain in a process referred to as service chaining. In a service function chain, each service function is performed by one or more virtual machines (VMs), which are typically spun on one or more of the computing nodes 110 to perform a particular service function of the service function chain.

An example service function chain includes more than one security service function (e.g., a virtualized firewall function, a virtualized intrusion detection function, etc.), each of which may be configured to process, in a particular order, the network packet. However, unlike traditional service function chain technologies, wherein each service function in the service function chain extracts and computes metadata of the network packet, as well as manipulating a header of the network packet, and forwards the network packet to the next service function in the service function chain, the switch 106 is configured to support hardware offload for service function metadata extraction/computation and network packet manipulation and forwarding. In other words, the work (e.g., computations performed at each network service of the service function chain) can be offloaded to the switch 106, thereby removing the overhead and latency attributable to the computations performed at each network service of the service function chain.

The network 104 may be embodied as any type of wired or wireless communication network, including cellular networks, such as Global System for Mobile Communications (GSM) or Long-Term Evolution (LTE), telephony networks, digital subscriber line (DSL) networks, cable networks, local or wide area networks, global networks (e.g., the Internet), or any combination thereof. It should be appreciated that the network 104 may serve as a centralized network and, in some embodiments, may be communicatively coupled to another network (e.g., the Internet). Accordingly, the network 104 may include a variety of network devices (not shown), virtual and physical, such as routers, switches, network hubs, servers, storage devices, compute devices, etc., as needed to facilitate communication between the source endpoint node 102 and the switch 106, as well as the switch 106 and the destination endpoint node 108.

Figure 2:
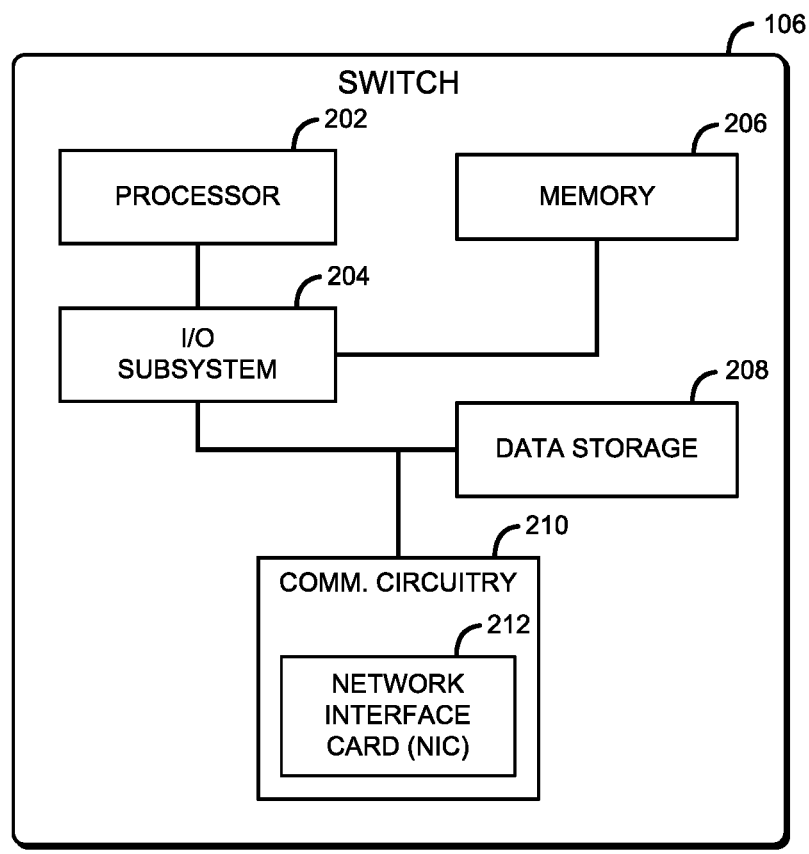
FIG. 2 is a simplified block diagram of at least one embodiment of the switch of the system of FIG. 1.

The switch 106 may be embodied as any type of network packet switching device that is capable of forwarding data (e.g., network packets) between computing devices (e.g., the source endpoint node 102 and the computing nodes 110, the source endpoint node 102 and the destination computing node 108, etc.) and performing the functions described herein. For example, the switch 106 may be embodied as, without limitation, a rack-mounted switch, a standalone switch, a fully managed switch, a partially managed switch, a full-duplex and/or half-duplex communication mode enabled switch, etc. As shown in FIG. 2, the illustrative switch 106 includes a processor 202, an input/output (I/O) subsystem 204, a memory 206, a data storage device 208, and communication circuitry 210. Of course, the switch 106 may include other or additional components, such as those commonly found in a switch, in other embodiments. Additionally, in some embodiments, one or more of the illustrative components may be incorporated in, or otherwise form a portion of, another component. For example, the memory 206, or portions thereof, may be incorporated in the processor 202 in some embodiments. Further, in some embodiments, one or more of the illustrative components may be omitted from the switch 106.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein. In operation, the memory 206 may store various data and software used during operation of the switch 106, such as operating systems, applications, programs, libraries, and drivers. The memory 206 is communicatively coupled to the processor 202 via the I/O subsystem 204, which may be embodied as circuitry and/or components to facilitate input/output operations with the processor 202, the memory 206, and other components of the switch 106. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the switch 106, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. It should be appreciated that the data storage device 208 and/or the memory 206 (e.g., the computer-readable storage media) may store various data as described herein, including operating systems, applications, programs, libraries, drivers, instructions, etc., capable of being executed by a processor (e.g., the processor 202) of the switch 106.

The communication circuitry 210 may be embodied as any communication circuit, device, or collection thereof, capable of enabling communications between the switch 106 and other computing devices (e.g., the source endpoint node 102, the computing nodes 110, the destination endpoint node 108, etc.) over a network (e.g., the network 104). The communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 210 includes a network interface controller (NIC) 212. The NIC 212 may be embodied as one or more add-in-boards, daughtercards, network interface cards, controller chips, chipsets, or other devices that may be used by the switch 106. For example, in some embodiments, the NIC 212 may be integrated with the processor 202, embodied as an expansion card coupled to the I/O subsystem 204 over an expansion bus (e.g., PCI Express), part of an SoC that includes one or more processors, or included on a multichip package that also contains one or more processors.

Alternatively, in some embodiments, the NIC 212 may include a local processor (not shown) and/or a local memory (not shown) that are both local to the NIC 212. In such embodiments, the local processor of the NIC 212 may be capable of performing the offloaded functions (e.g., replication, network packet processing, etc.) as described herein. Additionally or alternatively, in such embodiments, the local memory of the NIC 212 may be capable of storing data local to the NIC 212. Additionally or alternatively, in some embodiments, functionality of the NIC 212 may be integrated into one or more components of the switch 106 at the board level, socket level, chip level, and/or other levels.

It should be appreciated that, in some embodiments, the system may include an intermediary computing device (not shown) (e.g., a computer networking device, a client service node, a proxy computing device, etc.) that includes the components of the illustrative switch 106 of FIG. 2, as well as a hardware switch and/or a NIC capable of performing the functions of the switch 106 as described herein. In other words, in some embodiments, the switch 106 may not be a standalone computing device, but rather the switch 106 may be a hardware component of the intermediary computing device (e.g., a hardware switch, a NIC, etc.) to which the functions described herein may be offloaded to and performed by.

Referring again to FIG. 1, the illustrative cluster of computing nodes 110 includes a first computing node, which is designated as computing node (1) 112, a second computing node, which is designated as computing node (2) 114, and a third computing node, which is designated as computing node (N) 116 (i.e., the "Nth" computing node of the computing nodes 110, wherein "N" is a positive integer and designates one or more additional computing nodes 110). The computing nodes 110 may be embodied as any type of computation or computer device capable of performing the functions described herein, including, without limitation, a server (e.g., stand-alone, rack-mounted, blade, etc.), a network appliance (e.g., physical or virtual), a high-performance computing device, a web appliance, a distributed computing system, a computer, a processor-based system, a multiprocessor system, and/or a mobile computing device (e.g., a smartphone, a tablet computer, a laptop computer, a notebook computer, a wearable computing device, etc.). As such, similar to the illustrative switch 106 of FIG. 2, each of the computing nodes 110 may include a processor, an I/O subsystem, a memory, a data storage device, and/or communication circuitry, which are not shown for clarity of the description. Accordingly, further descriptions of the like components are not repeated herein with the understanding that the description of the corresponding components provided above in regard to the switch 106 applies equally to the corresponding components of each of the computing nodes 110.

Each of the source endpoint node 102 and the destination endpoint node 108 may be embodied as any type of computation or computer device capable of performing the functions described herein, including, without limitation, a compute device, a storage device, a mobile computing device (e.g., a smartphone, a tablet, a laptop, a notebook, a wearable, etc.), a server (e.g., stand-alone, rack-mounted, blade, etc.), a network appliance (e.g., physical or virtual), a web appliance, a distributed computing system, a processor-based system, and/or a multiprocessor system. Similar to the illustrative switch 106 of FIG. 2, each of the source endpoint node 102 and the destination endpoint node 108 may include a processor, an I/O subsystem, a memory, a data storage device, and/or communication circuitry, which are not shown for clarity of the description. As such, further descriptions of the like components are not repeated herein with the understanding that the description of the corresponding components provided above in regard to the switch 106 applies equally to the corresponding components of the source endpoint node 102 and the destination endpoint node 108.

In some embodiments, the system 100 may additionally include a controller node 118 (e.g., a network controller) that is communicatively coupled to the switch 106. The controller node 118 may be embodied as any type of type of hardware, software, and/or firmware capable of performing the functions described herein. For example, in some embodiments, without limitation, the controller node 118 may be embodied as a hypervisor or virtual machine manager (VMM), an SDN controller, or an NFV management and orchestration (MANO). In such embodiments, the controller node 118 may be configured to provide policy information (e.g., network packet flow identifying information, network packet forwarding information, security information, network packet processing information, etc.) to the switch 106. It should be appreciated that, in some embodiments, the controller node 118 may be connected to more than one switch 106. In such embodiments, the controller node 118 may be configured to discover and configure all of the capable connected switches to build a complete forwarding path for the service function chain across more than one switch 106.

Figure 3:
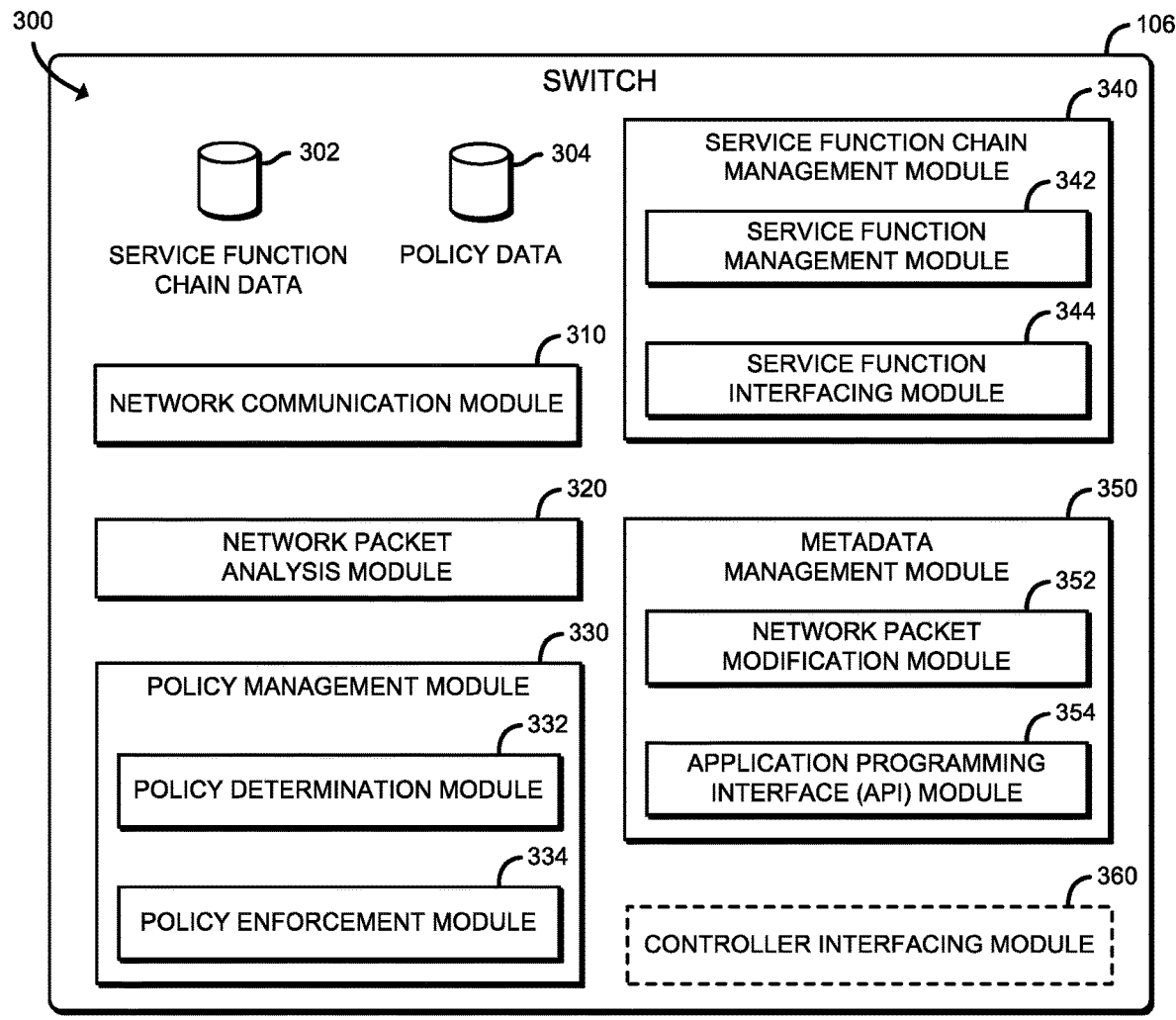
FIG. 3 is a simplified block diagram of at least one embodiment of an environment that may be established by the switch of FIGS. 1 and 2.

Referring now to FIG. 3, in an illustrative embodiment, the switch 106 establishes an environment 300 during operation. The illustrative environment 300 includes a network communication module 310, a network packet analysis module 320, a policy management module 330, a service function chain management module 340, a metadata management module 350, and, in some embodiments, a controller interfacing module 360. Each of the modules, logic, and other components of the environment 300 may be embodied as hardware, software, firmware, or a combination thereof. For example, each of the modules, logic, and other components of the environment 300 may form a portion of, or otherwise be established by, the processor 202, the communication circuitry 210 (e.g., the NIC 212), and/or other hardware components of the switch 106. As such, in some embodiments, one or more of the modules of the environment 300 may be embodied as circuitry or a collection of electrical devices (e.g., network communication circuitry 310, network packet analysis circuitry 320, policy management circuitry 330, service function chain management circuitry 340, metadata management circuitry 350, controller interfacing circuitry 360, etc.).

In the illustrative environment 300, the switch 106 includes service function chain data 302 and policy data 304, each of which may be accessed by the various modules and/or sub-modules of the switch 106. It should be appreciated that the switch 106 may include other components, sub-components, modules, sub-modules, and/or devices commonly found in a network switch, which are not illustrated in FIG. 3 for clarity of the description.

The network communication module 310 is configured to facilitate inbound and outbound network communications (e.g., network traffic, network packets, network flows, etc.) to and from the switch 106. To do so, the network communication module 310 is configured to receive and process network packets from other computing devices (e.g., the source endpoint node 102, one or more of the computing nodes 110, and/or another computing device communicatively coupled via the network 104). Additionally, the network communication module 310 is configured to prepare and transmit network packets to another computing device (e.g., the destination computing node 108, one or more of the computing nodes 110, and/or another computing device communicatively coupled via the network 104). Accordingly, in some embodiments, at least a portion of the functionality of the network communication module 310 may be performed by the communication circuitry 210, and more specifically by the NIC 212.

The network packet analysis module 320 is configured to analyze at least a portion of the network packet (e.g., a header of the network packet) to determine a classification (e.g., a payload type, a workload type, a service context, etc.) a network packet received by the switch 106. To do so, in some embodiments, the network packet analysis module 320 may be configured to retrieve an identifier (e.g., a source internet protocol (IP) address, a destination IP address, a source network port, a destination network port, a dynamic host configuration protocol (DHCP) address, a protocol, etc.) of the network packet, such as from a header of the network packet. For example, in some data center environments employing service function chaining, an allocation scheme may be used, such as Network Service Header (NSH) Context Header Allocation. In such embodiments, the network packet analysis module 320 may rely on the allocation scheme (e.g., NSH structure context headers) to provide a mechanism for carrying out the classification of the network packet, determining metadata for the network packet to be processed by each of the various service functions of the service function chain, and/or providing an insertion point at which to store the metadata.

The policy management module 330 is configured manage and enforce policies for network packets received at the switch 106. To do so, the policy management module includes a policy determination module 332 and a policy enforcement module 334. The policy determination module 332 is configured to determine a policy for each received network packet based a previously determined characteristic of the network packet, such as the identifier and/or the classification. The policy enforcement module 334 is configured to enforce the policies, such as those policies received from the controller via the controller interfacing module 360, as described below.

Each policy defines a set of instructions usable by the policy determination module 332 and/or the policy enforcement module 334 to perform a particular function or to forward instruction to another computing device (e.g., one of the computing nodes 110) usable by the receiving computing device to perform a particular function. For example, each policy may be usable to identify a corresponding network flow based on the identifier/characteristic of the network packet, as well as a set of service functions (e.g., packet inspection, intrusion detection, and firewalls) that are required to process the received network packet. In some embodiments, the policy may be stored in the policy data 304.

The service function chain management module 340 is configured to generate, or otherwise determine, the service functions of the service function chain to process the network packet. In other words, the service function chain management module 340 is configured to manage a service function chain of a plurality of service functions, each of which may be configured to perform a particular network packet processing function. To do so, the service function chain management module 340 includes a service function management module 342 and a service function interfacing module 344.

The service function management module 342 is configured provide information to one or more of the computing nodes 110 usable by the computing nodes 110 to spin up and wind down one or more virtual machines (VMs) for each of the service functions of the service function chain. Additionally, the service function management module 342 is configured to manage which VMs have been instantiate on which of the computing nodes 110, as well as which service function is to be performed by each of the VMs. In some embodiments, such information may be stored in the service function chain data 302.

The service function interfacing module 344 is configured to provide an interface between the switch 106 and each service function of the service function chain running on the one or more of the computing nodes 110. As such, the network service interfacing module 344 is configured to forward the network packet to the appropriate computing nodes 110 based on which of the computing nodes 110 is performing a particular service function. Additionally, the network service interfacing module 344 is configured to receive feedback from the computing nodes 110 as a result of the service function(s) being performed thereon. It should be appreciated that, in some embodiments, such as when the service function is non-service function chain aware or is a legacy service, a service function chain proxy may be implemented between the service function interfacing module 344 and the service function to process and/or store the metadata.

The metadata management module 350 is configured to determine metadata that corresponds to the received network packet. The metadata may include information usable to identify the classification and/or the policy of the network packet, such that the metadata may be used to create and/or enforce policies. For example, the metadata may include a hash result of the identifier of the network packet such that each service function in the service function chain does not have to compute the hash key. In another example, the metadata may include whether or not a payload of the network packet is a reconstructed IP frame, such that each service function does not have to process the TCP/IP stack and removes the latency, energy, etc. attributable to such processing. In still another example, the metadata may include timestamp information about packet arrival in each service function. In yet another example, the metadata may include tenant specific information.

As such, the metadata may be based on the determined characteristic of the received network packet, a service function to which the network packet is to be forwarded, and/or feedback received from a previous service function at which the network packet was previously processed. In some embodiments, the metadata may be further based on a static configuration (e.g., configured by the controller node 118) and/or a dynamic condition encountered by the previous service function of the service function chain. Additionally, in some embodiment, the metadata may be standardized or proprietary to particular service providers.

Additionally, the metadata management module 350 is configured to insert the metadata into a portion (e.g., a header) of the network packet. To do so, the metadata management module 350 may include a network packet modification module 352 to modify (e.g., insert or remove) metadata in a header of the network packet. In some embodiments, the received network packet may be preserved to maintain the integrity of the network packet. In such embodiments, the network packet modification module 352 may be further configured to generate a replica of the received network packet. Accordingly, it should be appreciated that modifications to the network packet, such as those described herein, may be performed on the replicated network packet rather than the received network packet.

The metadata management module 350 may be additionally or alternatively configured to store the metadata local to the switch 106 and provide an application programming interface (API) to the corresponding service function such that the corresponding service function can use the API to read the locally stored metadata. To do so, the metadata management module 350 may include an application programming interface (API) module 354 to store the metadata locally (e.g., in memory 206 and/or the data storage device 208) and provide the API to the corresponding service function to read the locally stored metadata.

In some embodiments, the metadata management module 350 may be further configured to maintain statistics of the metadata. In such embodiments, the switch 106 may use the statistics to perform load balancing, optimize paths, etc.

The controller interfacing module 360 may be configured to interface with a controller (e.g., the controller node 118). For example, the controller interfacing module 360 may be configured to receive policy information (e.g., metadata collection policy data, service function policy data, etc.) from the controller that is usable by the switch 106 to perform a particular function. As described previously, such policy information may be stored at the policy data 304. As also described previously, such policy information may be used to determine a characteristic of the network packet and/or define which service functions are required to process the network packet. In some embodiments, the controller interfacing module 360 may additionally provide feedback to the controller, which may be usable by the controller to update the policy information for the switch 106.

Figure 4:
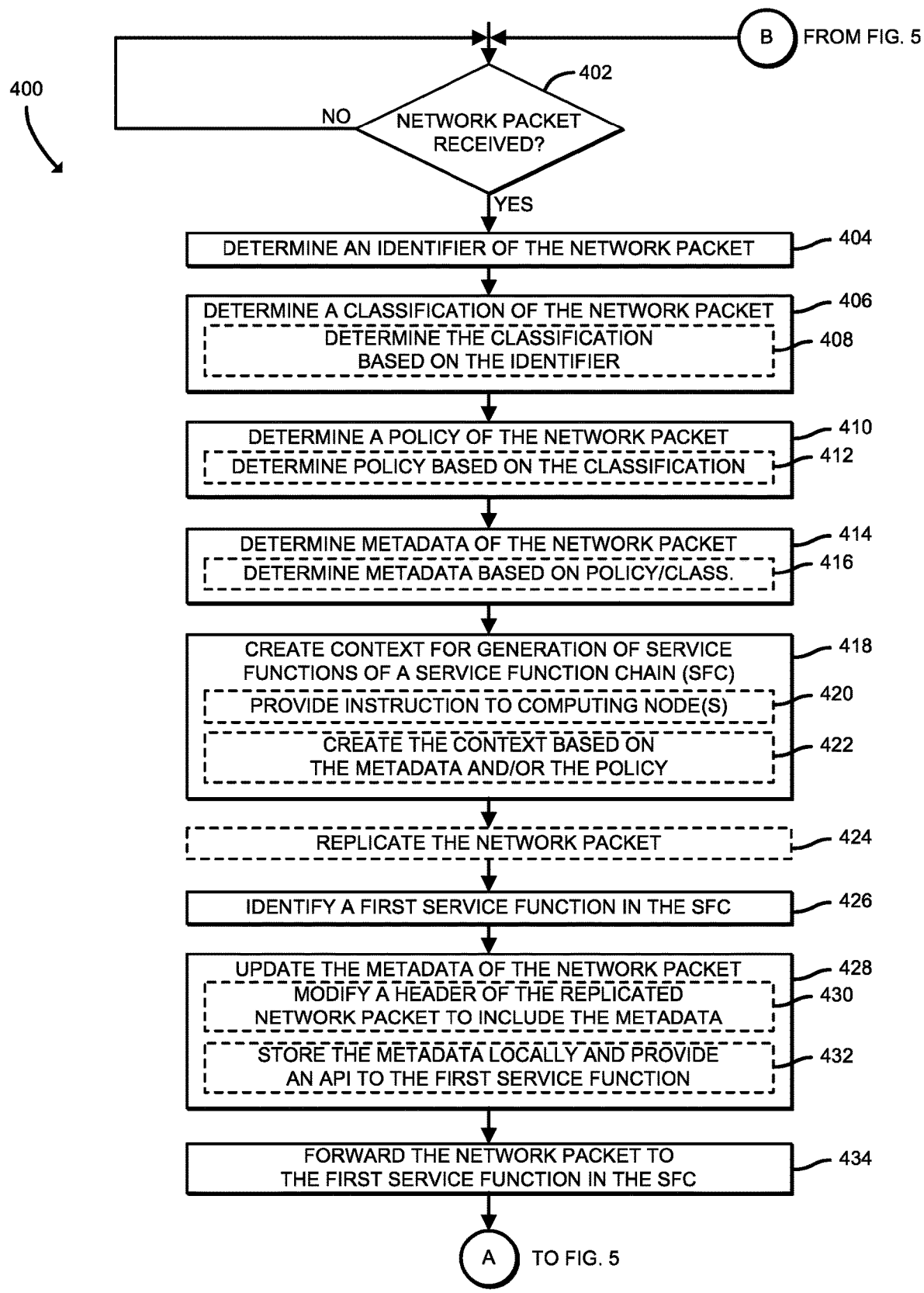
FIGS. 4 and 5 are a simplified flow diagram of at least one embodiment of a method for switch-assisted service function chain management that may be executed by the switch of FIGS. 1 and 2.
Figure 5:
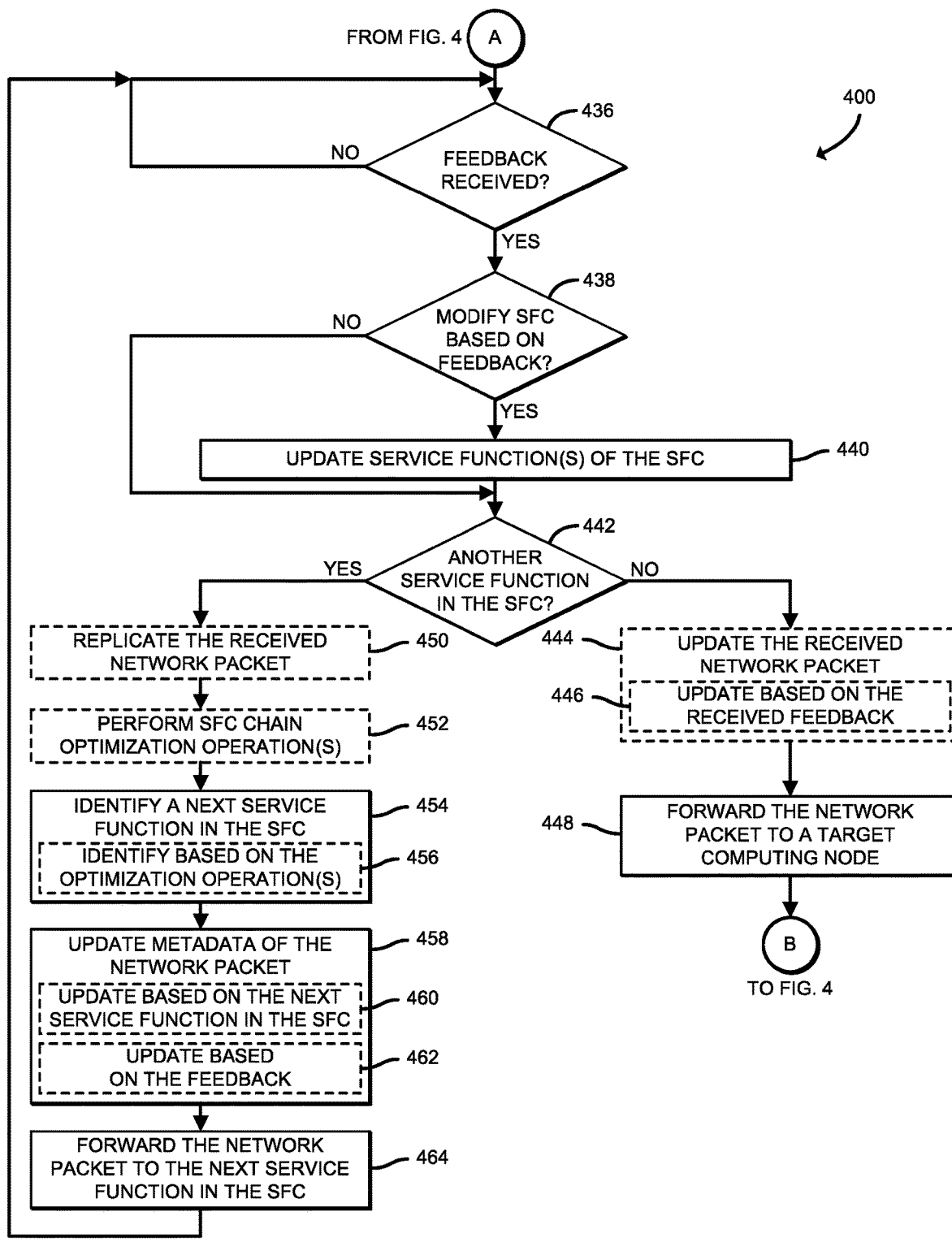

Referring now to FIGS. 4 and 5, in use, the switch 106 may execute a method 400 for switch-assisted service function chain management. It should be appreciated that at least a portion of the method 400 may be offloaded to and executed by the NIC 212 of the switch 106. It should be further appreciated that, in some embodiments, the method 400 may be embodied as various instructions stored on a computer-readable media, which may be executed by the processor 202, the NIC 212, and/or other components of the switch 106 to cause the switch 106 to perform the method 400. The computer-readable media may be embodied as any type of media capable of being read by the switch 106 including, but not limited to, the memory 206, the data storage 208, a local memory of the NIC 212, other memory or data storage devices of the switch 106, portable media readable by a peripheral device of the switch 106, and/or other media.

The method 400 begins with block 402, in which the switch 106 determines whether a network packet was received by the switch 106, such as from the source endpoint node 102. If the network packet was not received, the method 400 loops back to block 402 to continue to determine whether the network packet was received. Otherwise, if the network packet was received, the method 400 advances to block 404. In block 404, the switch 106 determines an identifier of the network packet. As described previously, the identifier may include any data indicative of an identifiable characteristic of a data object included in the network packet, such as, but not limited to a source IP address, a destination IP address, a source network port, a destination network port, a protocol, etc. To do so, for example, the switch 106 may parse a header of the network packet to extract particular information from the header. In block 406, the switch 106 determines a classification (e.g., a network flow, a workload type, an application type, etc.) of the network packet. The classification may be based on a comparison (e.g., a tuple-match) by the switch 106 of the identifier determined during the network packet analysis performed in block 404. Accordingly, in some embodiments, in block 408, the switch 106 may determine the classification based on the identifier determined in block 404.

In block 410, the switch 106 determines a policy of the network packet. As described previously, the policy may include instructions providing direction to the switch 106 on particular functions to perform, how to perform the particular functions, and/or instructions to be provided to other computing devices to perform particular functions. In some embodiments, in block 412, the policy may be determined based on the classification determined in block 406. In block 414, the switch 106 determines metadata of the network packet. As described previously, the metadata may include information usable to identify the classification and/or the policy of the network packet, such that the metadata may be used to create and/or enforce policies, for example. In some embodiments, in block 416, the switch 106 determines the metadata based on the policy and/or the classification.

In block 418, the switch 106 creates a context (i.e., a service context) for generation of service functions of a service function chain. In some embodiments, in block 420, the context may be used by the switch 106 to provide instruction to one or more of the computing nodes 110 that indicates a variety of service functions to be performed at the computing nodes 110. Additionally, in some embodiments, in block 422, the switch 106 creates the context based on the metadata determined at block 414 and/or the policy determined at block 410.

In some embodiments, in block 424, the switch 106 may replicate the network packet to preserve the integrity of the received network packet. In other words, the replicated network packet may be modified (e.g., in block 430) and processed by the various service functions rather than the received network packet. In block 426, the switch 106 identifies a VM presently executing at one of the computing nodes 110 capable of performing a first service function in the service function chain (i.e., generated by the context created in block 418). In block 428, the switch 106 updates the metadata of the network packet. In some embodiments, in block 430, the switch 106 modifies a header of the network packet to include the metadata determines at block 414. Alternatively, in some embodiments, in block 432, the switch 106 stores the metadata local to the switch 106 (e.g., the memory 206 and/or the data storage device 208) and provides an API to the first service function such that the API is usable by the first service function to read the metadata stored local to the switch 106.

In block 434, the switch 106 forwards the network packet to the first service function of the service function chain. In block 436, the switch 106 determines whether feedback was received for the first service function. If not, the method 400 loops back to block 436 to continue to determine whether the feedback was received. Otherwise, if the feedback was received, the method 400 advances to block 438. In block 438, the switch 106 determines whether to modify the existing service functions of the service function chain (i.e., modify the present service function chain) based on the feedback. If the service function chain is to be modified, the method 400 advances to block 440, wherein the switch 106 updates one or more of the service functions of the service function chain before advancing to block 442 described below. Otherwise, if the switch 106 determines not to modify the service function chain, the method 400 advances to block 442.

In block 442, the switch 106 determines whether the service function chain includes another service function. If not, the method 400 branches to block 444. In some embodiments, in block 444, the switch 106 may update the network packet. For example, in some embodiments, in block 446, the switch 106 may update the network packet based on the feedback received in block 436. In block 448, the updated network packet is forwarded to a target computing node (e.g., the destination computing node 108 of FIG. 1) before the method 400 returns to block 402 to determine whether another network packet was received.

Otherwise, if at block 442 the switch 106 determines the service chain includes another service function, the method 400 branches to block 450. In some embodiments, in block 450, the switch 106 may again replicate the received network packet. In such embodiments, the operations performed by the switch 106 in blocks 458 and 464 may be performed using the replicated network packet rather than the received network packet, thereby preserving the integrity of the received network packet. Additionally, in some embodiments, in block 452, the switch 106 may perform a service function chain optimization operation. Such optimization operations may include a load balancing operation (e.g., based on a load balancing policy), a service availability check, etc.

In block 454, the switch 106 identifies a next service function in the service function chain. In some embodiments, in block 456, the switch 106 may identify the next service function based on one or more of the optimization operations performed at block 452. In block 458, the switch 106 updates the metadata of the network packet. In some embodiments, in block 460, the switch 106 may update the metadata based on the next service function in the service function chain identified in block 454. Additionally or alternatively, in some embodiments, in block 462, the switch 106 may update the metadata based on the feedback received at block 436. In block 464, the switch 106 forwards the network packet including the updated metadata to the next service function identified in block 454 before the method 400 loops back to block 436 to receive feedback from the next service function.

Figure 6:
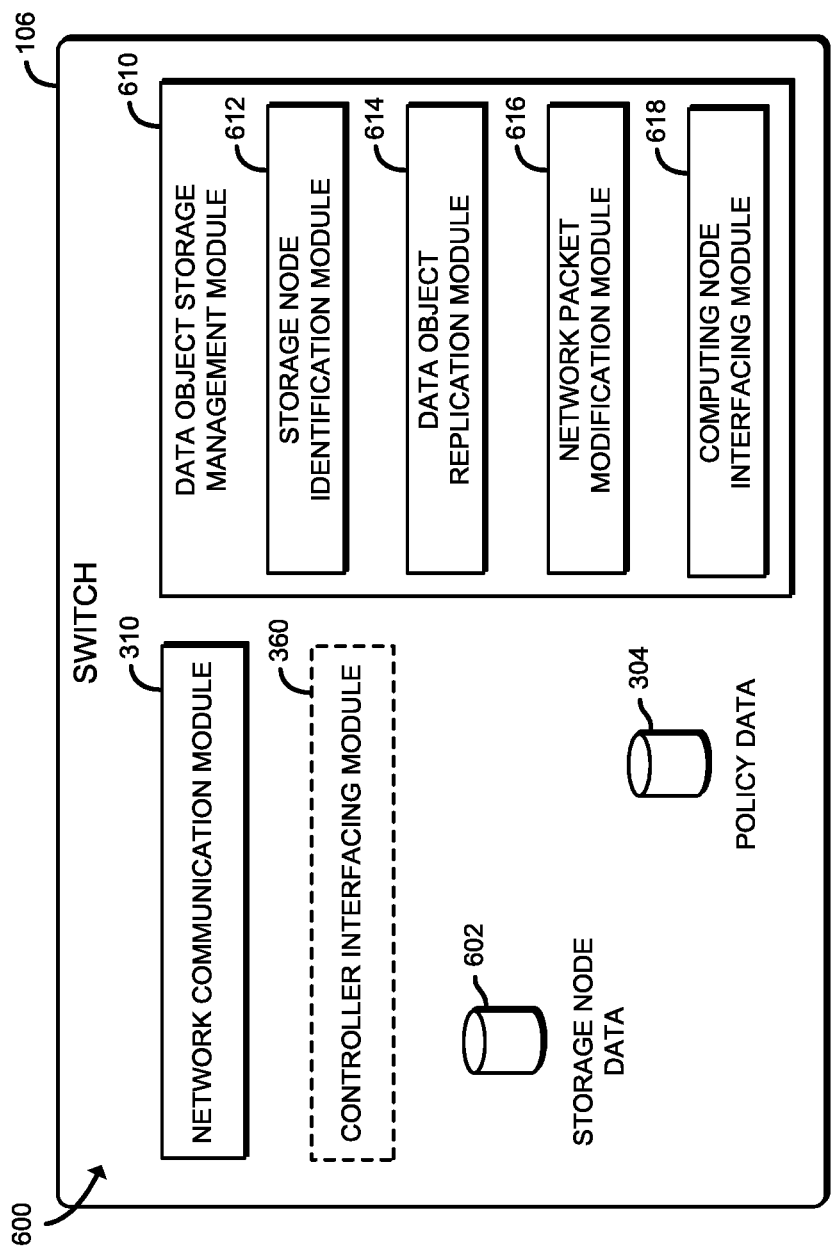
FIG. 6 is a simplified block diagram of at least one other embodiment of an environment that may be established by the switch of FIGS. 1 and 2.

Referring now to FIG. 6, in another illustrative embodiment, the switch 106 may establish an environment 600 during operation, which may be established instead of or in addition to the environment 300. The illustrative environment 600 includes a data object storage management module 610, as well as the network communication module 310 of FIG. 3, and, in some embodiments, the controller interfacing module 360 of FIG. 3. Each of the modules, logic, and other components of the environment 600 may be embodied as hardware, software, firmware, or a combination thereof. For example, each of the modules, logic, and other components of the environment 600 may form a portion of, or otherwise be established by, the processor 202, the communication circuitry 210 (e.g., the NIC 212), and/or other hardware components of the switch 106. As such, in some embodiments, one or more of the modules of the environment 600 may be embodied as circuitry or a collection of electrical devices (e.g., data object storage management circuitry 610, etc.).

In the illustrative environment 600, the switch 106 includes service function chain data 602 and the policy data 304 of FIG. 3, each of which may be accessed by the various modules and/or sub-modules of the switch 106. It should be appreciated that the switch 106 may include other components, sub-components, modules, sub-modules, and/or devices commonly found in a network switch, which are not illustrated in FIG. 6 for clarity of the description.

As described previously, the network communication module 310 is configured to facilitate inbound and outbound network communications (e.g., network traffic, network packets, network flows, etc.) to and from the switch 106. In some embodiments, the network communication module 310 may be configured to receive a network packet that includes a data object (e.g., a payload of a network packet) to be stored at a plurality of storage nodes (i.e., the computing nodes 110 capable of storing the data object). As also described previously, the controller interfacing module 360 may be configured to interface with a controller (e.g., the controller node 118), such as to retrieve policy information from the controller which may be stored in the policy data 304. In some embodiments, the controller interfacing module 350 may be configured to receive a policy that maps a characteristic of the network packet and/or the data object (e.g., a work flow, a workload type, a payload type, etc.) to a plurality of storage nodes. In such embodiments, the mapping policy may be stored at the policy data 304.

The data object storage management module 610 is configured to receive a data object and identify and store the received data object at a plurality of the computing nodes 110. To do so, the data object storage management module 610 includes a storage node identification module 612, a data object replication module 614, a network packet modification module 616, and a computing node interfacing module 618.

The storage node identification module 612 is configured to determine one or more storage nodes from the cluster of computing nodes 110 at which to store the data object. To do so, in some embodiments, the storage node identification module 612 may be configured to identify a network flow of the received data object, such as based on an identifier (e.g., a source IP address, a destination IP address, a source network port, a destination network port, a protocol, etc.) of the network packet and/or the data object. The identifier may include any data indicative of an identifiable characteristic of the data object, such as, but not limited to a source IP address, a destination IP address, a source network port, a destination network port, a protocol, etc. Alternatively, in some embodiments, the storage node identification module 612 may receive, from the source endpoint node 102, a list that includes identifying information of each of the storage nodes on which to store the data object. The storage node identification module 612 may be further configured to identify a main storage node to store the received data object and one or more storage nodes to store replicas of the data object.

The data object replication module 614 is configured to replicate the data object. To do so, the data object replication module 614 is configured to replicate the received data object a number of times equal to the number of storage nodes identified by the storage node identification module 612 on which to store the replicated data objects. Additionally, the data object replication module 614 is further configured to replicate information (e.g., header information, flow information, etc.) for each of the replicated data objects. The replicated information may be usable by the network communication module 310 to identify which of the replication storage nodes to forward a replicated data object.

The network packet modification module 616 is configured to modify the replicated information based on which of the replication storage nodes the replicated data object is to be forwarded to. For example, the network packet modification module 616 may be configured to update a characteristic (e.g., a destination address, a network flow, etc.) of the information corresponding to one of the replication storage nodes based on which replication storage node the replicated data object is to be forwarded to.

The computing node interfacing module 618 is configured to forward the data object and the replicated data objects to the identified storage nodes, such as those storage nodes identified by the storage node identification module. The computing node interfacing module 618 is further configured to receive and track acknowledgment network packets received from the storage nodes to which the data object and the replicated data objects were forwarded. Further, the computing node interfacing module 618 is configured to forward the received acknowledgment network packets to a computing node (e.g., the source endpoint node 102) from which the data object was originally received.

Figure 7:
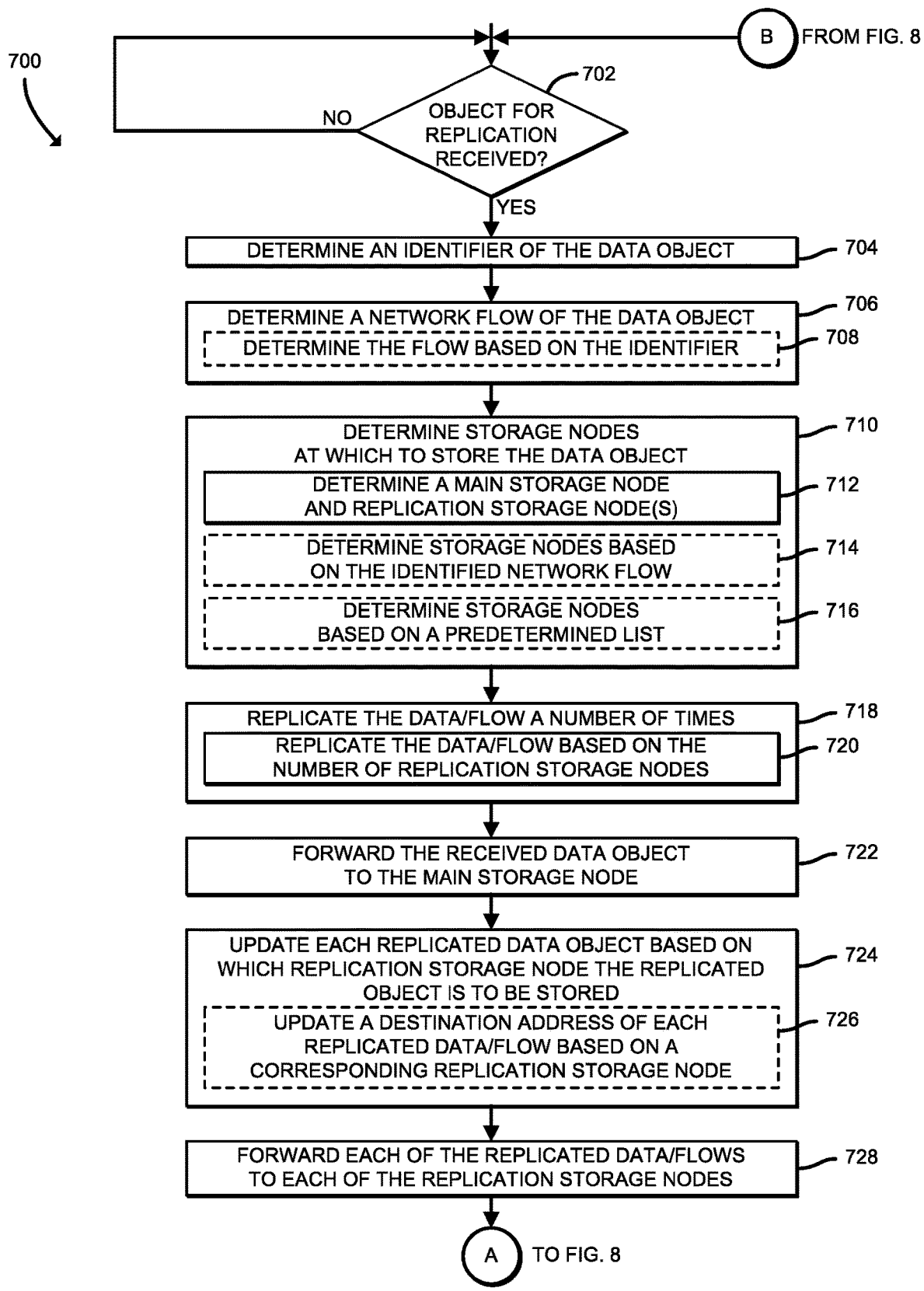
FIGS. 7 and 8 are a simplified flow diagram of at least one embodiment of a method for switch-assisted object replication that may be executed by the switch of FIGS. 1 and 2.
Figure 8:
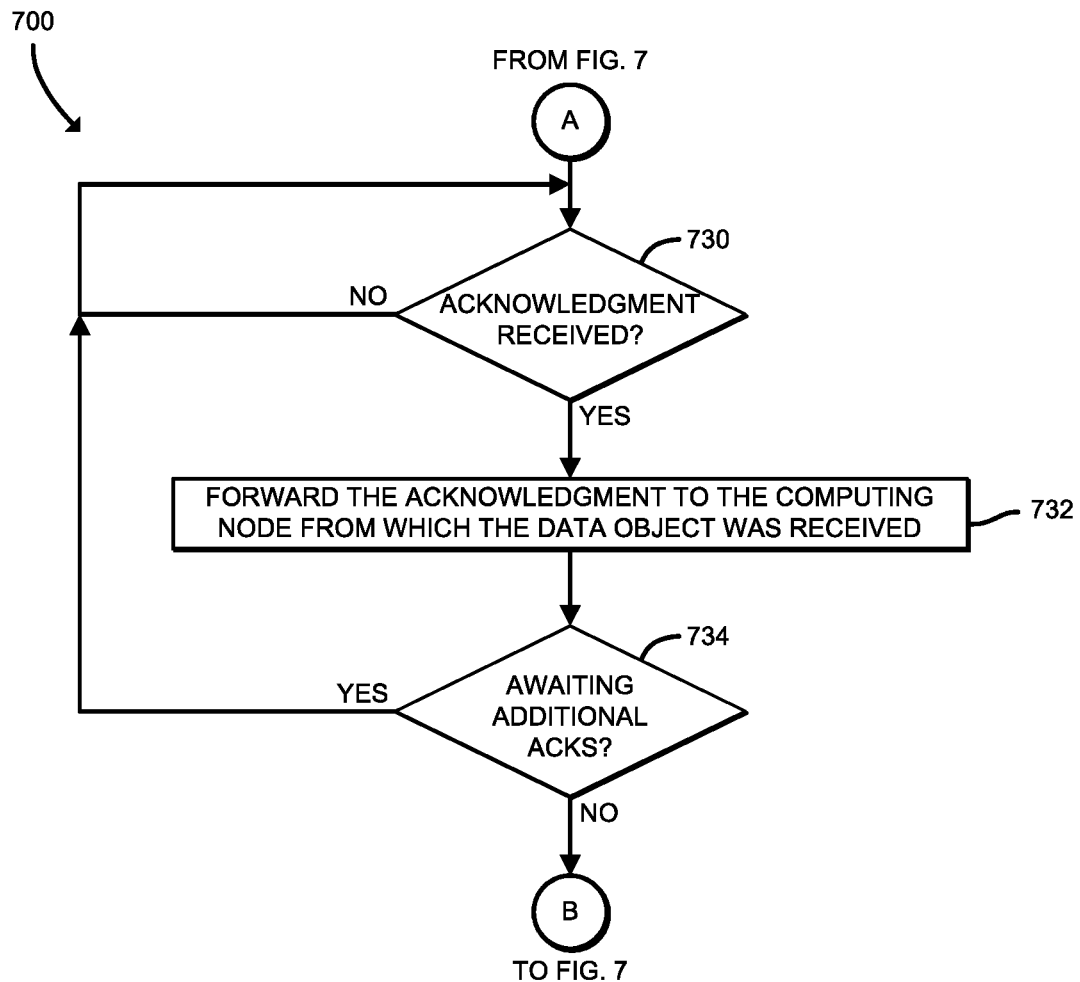

Referring now to FIGS. 7 and 8, in use, the switch 106 may execute a method 700 for switch assisted data object replication. It should be appreciated that at least a portion of the method 700 may be offloaded to and executed by the NIC 212 of the switch 106. It should be further appreciated that, in some embodiments, the method 700 may be embodied as various instructions stored on a computer-readable media, which may be executed by the processor 202, the NIC 212, and/or other components of the switch 106 to cause the switch 106 to perform the method 700. The computer-readable media may be embodied as any type of media capable of being read by the switch 106 including, but not limited to, the memory 206, the data storage 208, a local memory of the NIC 212, other memory or data storage devices of the switch 106, portable media readable by a peripheral device of the switch 106, and/or other media.

The method 700 begins with block 702, in which the switch 106 determines whether a data object (i.e., encapsulated in a network packet) for replication (i.e., redundant backup) was received by the switch 106, such as from the source endpoint node 102. If the data object was not received, the method 700 loops back to block 702 to continue to determine whether the data object was received. Otherwise, if the data object was received, the method 700 advances to block 704.

In block 704, the switch 106 determines an identifier of the data object. As described previously, the identifier may include any data indicative of an identifiable characteristic of the data object, such as, but not limited to a source IP address, a destination IP address, a source network port, a destination network port, a protocol, etc. For example, in some embodiments, the identifier may be determined from a header of the network packet that included the data object. In block 706, the switch determines a network flow of the data object. To do so, in some embodiments, in block 708, the switch 106 determines the network flow of the data object based on the identifier determined at block 704.

In block 710, the switch 106 determines a plurality of storage nodes at which to store the object. In block 712, the switch 106 determines a main storage node and one or more replication storage nodes from the available computing nodes 110 capable of storing the data object. In some embodiments, in block 714, the switch 106 may determine the storage nodes (i.e., the main and replication storage nodes) based on the network flow identified in block 706. Additionally or alternatively, in some embodiments, in block 716, the switch may determine the storage nodes based on a predetermined list. In some embodiments, the predetermined list (e.g., a list of storage nodes accompanying the data object in the network packet, a mapping table or a policy, etc.) may be received from an external source (e.g., the source endpoint node 102, the controller node 118, etc.) or be retrieved locally, such as from a table created local to the switch 106 based on a policy that includes a map of network flows to corresponding storage nodes, for example.

In block 718, the switch 106 replicates the data object and corresponding network flow a total number of times. To do so, in block 720, the switch 106 replicates the data object and corresponding network flow a number of times based on the number of replication storage nodes determined in block 712. In block 722, the switch 106 forwards the received data object to the main storage node determined in block 712. In block 724, the switch 106 updates each of the replicated data objects based on which replication storage node the replicated data object is to be stored at. To do so, in some embodiments, in block 726, the switch 106 may update the destination address in a header field of the network packet encapsulating a replicated data object.

In block 728, the switch 106 forwards each of the replicated network flows and data objects to each of the replication storage nodes. In block 730, the switch 106 determines whether an acknowledgment was received from one of the storage nodes (i.e., the main storage node or one of the replication storage nodes). If not, the method 700 loops back to block 730 to determine whether the acknowledgment was received. Otherwise, if the acknowledgment was received, the method 700 advances to block 732, wherein the switch 106 forwards the acknowledgment to the computing node (e.g., the source endpoint node 102 of FIG. 1) from which the data object was originally received at the switch 106. In block 734, the switch 106 determines whether there are additionally acknowledgments to be received. In other words, the switch determines whether all of the storage nodes have returned acknowledgments to the switch 106. If not, the method 700 loops back to block 730, wherein the switch 106 determines whether another acknowledgment was received. Otherwise, if all of the storage nodes have returned an acknowledgment, the method 700 loops back to block 702, wherein the switch 106 determines whether another data object was received for replication.

EXAMPLES

Illustrative examples of the technologies disclosed herein are provided below. An embodiment of the technologies may include any one or more, and any combination of, the examples described below.

Example 1 includes a switch for offloading service function chain management, the switch comprising one or more processors; and one or more memory devices having stored therein a plurality of instructions that, when executed by the one or more processors, cause the switch to receive a network packet from a source endpoint node communicatively coupled to the switch; update metadata for the network packet, wherein the metadata is based on one or more of a plurality of service functions of a service function chain being executed at a computing node communicatively coupled to the switch and configured to process the network packet based on the metadata; forward, subsequent to having inserted the metadata into the network packet, the network packet to the service function; receive, subsequent to having forwarded the network packet to the service function, feedback from the service function, wherein the feedback identifies a result of processing of the received network packet by a first service function; update, subsequent to having received the feedback, the metadata of the network packet based on the feedback received from the first service function and a next service function of the service function chain; and forward, subsequent to updating the metadata of the replicated network packet, the updated replicated network packet to the next service function of the service function chain.

Example 2 includes the subject matter of Example 1, and wherein the plurality of instructions further cause the switch to determine the plurality of service functions of the service function chain for the received network packet and provide an indication to one or more computing nodes communicatively coupled to the switch, wherein the indication identifies a set of instructions usable by the one or more computing nodes to spin up and configure one or more virtual machines to execute at least a portion of the service functions of the service function chain.

Example 3 includes the subject matter of any of Examples 1 and 2, and wherein the plurality of instructions further cause the switch to determine an identifier of the network packet; and identify a policy corresponding to the identifier, wherein the set of instructions is usable by the one or more computing nodes to spin up and configure the one or more virtual machines to execute at least a portion of the service functions of the service function chain based on the identified policy.

Example 4 includes the subject matter of any of Examples 1-3, and wherein the identifier of the network packet comprises at least one of a workload type, a network flow, a source internet protocol address, a source port number, a destination internet protocol address, a destination port number, and a protocol of the network packet.

Example 5 includes the subject matter of any of Examples 1-4, and wherein the plurality of instructions further cause the switch to generate a replicated network packet from the network packet, wherein to insert the metadata into the network packet comprises to insert the metadata into the replicated network packet.

Example 6 includes the subject matter of any of Examples 1-5, and wherein the plurality of instructions further cause the switch to update, in response to having received the feedback from the first service function, one or more of the service functions based on the feedback received from the first service function.

Example 7 includes the subject matter of any of Examples 1-6, and wherein the plurality of instructions further cause the switch to (i) determine, subsequent to having received the feedback, whether another service function of the service function chain is available and (ii) forward, in response to a determination that the next service function chain is unavailable, the network packet to a destination computing node communicatively coupled to the switch.

Example 8 includes the subject matter of any of Examples 1-7, and wherein to update the metadata comprises to insert the metadata a header of the network packet to include the metadata.

Example 9 includes the subject matter of any of Examples 1-8, and wherein to update the metadata comprises to store the metadata at a storage device of the switch and to provide an application programming interface to the next service function of the service function chain, wherein the application programming interface is usable to read the metadata stored at the switch.

Example 10 includes the subject matter of any of Examples 1-9, and wherein the plurality of instructions further cause the switch to (i) determine an identifier of the network packet and (ii) identify a policy corresponding to the identifier.

Example 11 includes the subject matter of any of Examples 1-10, and wherein to update the metadata of the network packet comprises to (i) determine the metadata based on the identified policy and (ii) insert the determined metadata into a header of the network packet.

Example 12 includes the subject matter of any of Examples 1-11, and wherein the identifier comprises one or more of a workload type, a network flow, a source internet protocol address, a source port number, a destination internet protocol address, a destination port number, and a protocol of the network packet.

Example 13 includes a method for offloading service function chain management to a switch, the method comprising receiving, by a switch, a network packet from a source endpoint node communicatively coupled to the switch; updating, by the switch, metadata for the network packet, wherein the metadata is based on a service function of a plurality of service functions of a service function chain being executed at a computing node communicatively coupled to the switch and configured to process the network packet based on the metadata; forwarding, by the switch and subsequent to updating the metadata, the network packet to the service function; receiving, by the switch and subsequent to forwarding the network packet to the service function, feedback from the service function, wherein the feedback identifies a result of processing of the network packet by a first service function; updating, by the switch and subsequent to receiving the feedback, the metadata of the network packet based on the feedback received from the first service function and a next service function of the service function chain; and forwarding, by the switch and subsequent to updating the metadata of the replicated network packet, the updated replicated network packet to the next service function of the service function chain.

Example 14 includes the subject matter of Examples 13, and further including determining, by the switch, the plurality of service functions of the service function chain for the received network packet; and providing, by the switch, an indication to one or more computing nodes communicatively coupled to the switch, wherein the indication identifies a set of instructions usable by the one or more computing nodes to spin up and configure one or more virtual machines to execute at least a portion of the service functions of the service function chain.

Example 15 includes the subject matter of any of Examples 13 and 14, and further including determining, by the switch, an identifier of the network packet; and identifying, by the switch, a policy corresponding to the identifier, wherein the set of instructions is usable by the one or more computing nodes to spin up and configure the one or more virtual machines to execute at least a portion of the service functions of the service function chain based on the identified policy.

Example 16 includes the subject matter of any of Examples 13-15, and wherein determining the identifier of the network packet comprises determining at least one of a workload type, a network flow, a source internet protocol address, a source port number, a destination internet protocol address, a destination port number, and a protocol of the network packet.

Example 17 includes the subject matter of any of Examples 13-16, and further including generating, by the switch, a replicated network packet from the network packet, wherein inserting the metadata into the network packet comprises inserting the metadata into the replicated network packet.

Example 18 includes the subject matter of any of Examples 13-17, and further including updating, by the switch and in response to receiving the feedback from the first service function, one or more of the service functions based on the feedback received from the first service function.

Example 19 includes the subject matter of any of Examples 13-18, and further including determining, by the switch and subsequent to receiving the feedback, whether another service function of the service function chain is available; and forwarding, by the switch and in response to a determination that the next service function chain is unavailable, the network packet to a destination computing node communicatively coupled to the switch.

Example 20 includes the subject matter of any of Examples 13-19, and wherein updating the metadata comprises inserting the metadata a header of the network packet to include the metadata.

Example 21 includes the subject matter of any of Examples 13-20, and wherein updating the metadata comprises storing the metadata at a storage device of the switch and providing an application programming interface to the next service function of the service function chain, wherein the application programming interface is usable to read the metadata stored at the switch.

Example 22 includes the subject matter of any of Examples 13-21, and further including determining, by the switch, an identifier of the network packet; and identifying, by the switch, a policy corresponding to the identifier.

Example 23 includes the subject matter of any of Examples 13-22, and wherein updating the metadata of the network packet comprises determining the metadata based on the identified policy and inserting the determined metadata into a header of the network packet.

Example 24 includes the subject matter of any of Examples 13-23, and wherein determining the identifier comprises determining one or more of a workload type, a network flow, a source internet protocol address, a source port number, a destination internet protocol address, a destination port number, and a protocol of the network packet.

Example 25 includes a switch comprising a processor; and a memory having stored therein a plurality of instructions that when executed by the processor cause the switch to perform the method of any of Examples 13-24.

Example 26 includes one or more machine readable storage media comprising a plurality of instructions stored thereon that in response to being executed result in a switch performing the method of any of Examples 13-24.

Example 27 includes a switch for offloading service function chain management, the switch comprising network communication circuitry to receive a network packet from a source endpoint node communicatively coupled to the switch; metadata management circuitry to update metadata for the network packet, wherein the metadata is based on one or more of a plurality of service functions of a service function chain being executed at a computing node communicatively coupled to the switch and configured to process the network packet based on the metadata; and service function chain management circuitry to (i) forward, subsequent to having inserted the metadata into the network packet, the network packet to the service function and (ii) receive, subsequent to having forwarded the network packet to the service function, feedback from the service function, wherein the feedback identifies a result of processing of the received network packet by a first service function, wherein the metadata management circuitry is further to update, subsequent to having received the feedback, the metadata of the network packet based on the feedback received from the first service function and a next service function of the service function chain, and wherein the service function chain management circuitry is further to forward, subsequent to updating the metadata of the replicated network packet, the updated replicated network packet to the next service function of the service function chain.

Example 28 includes the subject matter of Example 27, and further including policy management circuitry to determine the plurality of service functions of the service function chain for the received network packet, wherein the service function chain management circuitry is further to provide an indication to one or more computing nodes communicatively coupled to the switch, wherein the indication identifies a set of instructions usable by the one or more computing nodes to spin up and configure one or more virtual machines to execute at least a portion of the service functions of the service function chain.

Example 29 includes the subject matter of any of Examples 27 and 28, and further including network packet analysis circuitry to determine an identifier of the network packet; and policy management circuitry to identify a policy corresponding to the identifier, and wherein the set of instructions is usable by the one or more computing nodes to spin up and configure the one or more virtual machines to execute at least a portion of the service functions of the service function chain is based on the identified policy.

Example 30 includes the subject matter of any of Examples 27-29, and wherein the identifier of the network packet comprises at least one of a workload type, a network flow, a source internet protocol address, a source port number, a destination internet protocol address, a destination port number, and a protocol of the network packet.

Example 31 includes the subject matter of any of Examples 27-30, and wherein the metadata management circuitry is further to generate a replicated network packet from the network packet, wherein to insert the metadata into the network packet comprises to insert the metadata into the replicated network packet.

Example 32 includes the subject matter of any of Examples 27-31, and wherein the service function chain management circuitry is further to update, in response to having received the feedback from the first service function, one or more of the service functions based on the feedback received from the first service function.

Example 33 includes the subject matter of any of Examples 27-32, and wherein the service function chain management circuitry is further to (i) determine, subsequent to having received the feedback, whether another service function of the service function chain is available and (ii) forward, in response to a determination that the next service function chain is unavailable, the network packet to a destination computing node communicatively coupled to the switch.

Example 34 includes the subject matter of any of Examples 27-33, and wherein to update the metadata comprises to insert the metadata a header of the network packet to include the metadata.

Example 35 includes the subject matter of any of Examples 27-34, and wherein to update the metadata comprises to store the metadata at a storage device of the switch and to provide an application programming interface to the next service function of the service function chain, wherein the application programming interface is usable to read the metadata stored at the switch.

Example 36 includes the subject matter of any of Examples 27-35, and further including network packet analysis circuitry to determine an identifier of the network packet; and policy management circuitry to identify a policy corresponding to the identifier.

Example 37 includes the subject matter of any of Examples 27-36, and wherein to update the metadata of the network packet comprises to (i) determine the metadata based on the identified policy and (ii) insert the determined metadata into a header of the network packet.

Example 38 includes the subject matter of any of Examples 27-37, and wherein the identifier comprises one or more of a workload type, a network flow, a source internet protocol address, a source port number, a destination internet protocol address, a destination port number, and a protocol of the network packet.

Example 39 includes one or more computer-readable storage media comprising a plurality of instructions stored thereon that in response to being executed cause a switch to network communication circuitry to receive a network packet from a source endpoint node communicatively coupled to the switch; means for updating metadata for the network packet, wherein the metadata is based on one or more of a plurality of service functions of a service function chain being executed at a computing node communicatively coupled to the switch and configured to process the network packet based on the metadata; means for forwarding, subsequent to having inserted the metadata into the network packet, the network packet to the service function; and means for receiving, subsequent to having forwarded the network packet to the service function, feedback from the service function, wherein the feedback identifies a result of processing of the received network packet by a first service function, wherein the metadata management circuitry is further to update, subsequent to having received the feedback, the metadata of the network packet based on the feedback received from the first service function and a next service function of the service function chain, and wherein the service function chain management circuitry is further to forward, subsequent to updating the metadata of the replicated network packet, the updated replicated network packet to the next service function of the service function chain.

Example 40 includes the subject matter of Example 39, and further including means for determining the plurality of service functions of the service function chain for the received network packet; and means for providing an indication to one or more computing nodes communicatively coupled to the switch, wherein the indication identifies a set of instructions usable by the one or more computing nodes to spin up and configure one or more virtual machines to execute at least a portion of the service functions of the service function chain.

Example 41 includes the subject matter of any of Examples 39 and 40, and further including means for determining an identifier of the network packet; and means for identifying a policy corresponding to the identifier, wherein the set of instructions is usable by the one or more computing nodes to spin up and configure the one or more virtual machines to execute at least a portion of the service functions of the service function chain based on the identified policy.

Example 42 includes the subject matter of any of Examples 39-41, and wherein the identifier of the network packet comprises at least one of a workload type, a network flow, a source internet protocol address, a source port number, a destination internet protocol address, a destination port number, and a protocol of the network packet.

Example 43 includes the subject matter of any of Examples 39-42, and further including means for generating a replicated network packet from the network packet, wherein the means for inserting the metadata into the network packet comprises means for inserting the metadata into the replicated network packet.

Example 44 includes the subject matter of any of Examples 39-43, and further including means for updating, in response to having received the feedback from the first service function, one or more of the service functions based on the feedback received from the first service function.

Example 45 includes the subject matter of any of Examples 39-44, and further including means for determining, subsequent to having received the feedback, whether another service function of the service function chain is available; and means for forwarding, in response to a determination that the next service function chain is unavailable, the network packet to a destination computing node communicatively coupled to the switch.

Example 46 includes the subject matter of any of Examples 39-45, and wherein the means for updating the metadata comprises means for inserting the metadata a header of the network packet to include the metadata.

Example 47 includes the subject matter of any of Examples 39-46, and wherein the means for updating the metadata comprises means for: (i) storing the metadata at a storage device of the switch and (ii) providing an application programming interface to the next service function of the service function chain, wherein the application programming interface is usable to read the metadata stored at the switch.

Example 48 includes the subject matter of any of Examples 39-47, and further including means for determining an identifier of the network packet; and means for identifying a policy corresponding to the identifier.

Example 49 includes the subject matter of any of Examples 39-48, and wherein the means for updating the metadata of the network packet comprises means for (i) determining the metadata based on the identified policy and (ii) inserting the determined metadata into a header of the network packet.

Example 50 includes the subject matter of any of Examples 39-49, and wherein the identifier comprises one or more of a workload type, a network flow, a source internet protocol address, a source port number, a destination internet protocol address, a destination port number, and a protocol of the network packet.

Example 51 includes a switch for offloading service function chain management, the switch comprising one or more processors; and one or more memory devices having stored therein a plurality of instructions that, when executed by the one or more processors, cause the switch to receive a data object to be replicated from a source endpoint node; identify a network flow associated with the data object; determine a plurality of storage nodes at which the data object is to be stored based on the network flow, wherein each of the storage nodes is communicatively coupled to the switch; replicate the data object a number of times based on a total number of the storage nodes; and transmit each one of the received data object and the replicated data objects to a corresponding one of the storage nodes.

Example 52 includes the subject matter of Example 51, and wherein to determine the storage nodes comprises to determine a main storage node and one or more replication storage nodes.

Example 53 includes the subject matter of any of Examples 51 and 52, and wherein to transmit the received data object and the replicated data objects to a corresponding one of the determined storage nodes comprises to (i) transmit the received data object to the main storage node and (ii) transmit one of the replicated data objects to a corresponding one of the replication storage nodes.

Example 54 includes the subject matter of any of Examples 51-53, and wherein the plurality of instructions further cause the switch to update a destination address for each of the replicated data objects based on a storage node of the storage nodes to which the replicated data object is to be transmitted.

Example 55 includes the subject matter of any of Examples 51-54, and wherein to replicate the data object based on the determined total number of storage nodes comprises to replicate each of (i) the network flow of the data object and (ii) data of the data object based on the total number of storage nodes determined.

Example 56 includes the subject matter of any of Examples 51-55, and wherein to receive the data object to be replicated includes to receive an identifier for each of the storage nodes on which the data object is to be stored.

Example 57 includes the subject matter of any of Examples 51-56, and wherein to receive the data object to be replicated includes to receive a set of instructions, wherein the set of instructions includes one or more switch interface commands capable of being used by the switch to enable replication to each of the storage nodes.

Example 58 includes the subject matter of any of Examples 51-57, and wherein the plurality of instructions further cause the switch to receive, in response to having transmitted the received data object and the replicated data objects, an acknowledgment from each of the storage nodes, wherein the acknowledgment indicates successful transmission of the data object from the switch to a corresponding one of the storage nodes.

Example 59 includes the subject matter of any of Examples 51-58, and wherein the plurality of instructions further cause the switch to transmit, in response to having received the acknowledgment, the acknowledgment to the source endpoint node.

Example 60 includes a method for offloading data object replication to a switch, the method comprising receiving, by a switch, a data object to be replicated from a source endpoint node; identifying, by the switch, a network flow associated with the data object; determining, by the switch, one or more storage nodes at which the data object is to be stored based on the network flow, wherein each of the storage nodes is communicatively coupled to the switch; replicating, by the switch, the data object based on a determined total number of the storage nodes; and transmitting, by the switch, each one of the received data object and the replicated data objects to a corresponding one of the determined storage nodes.

Example 61 includes the subject matter of Example 60, and wherein determining the storage nodes comprises determining a main storage node and one or more replication storage nodes.

Example 62 includes the subject matter of any of Examples 60 and 61, and wherein transmitting the received data object and the replicated data objects to a corresponding one of the determined storage nodes comprises transmitting the received data object to the main storage node and transmitting one of the replicated data objects to a corresponding one of the replication storage nodes.

Example 63 includes the subject matter of any of Examples 60-62, and further including updating a destination address for each of the replicated data objects based on a storage node of the storage nodes to which the replicated data object is to be transmitted.

Example 64 includes the subject matter of any of Examples 60-63, and wherein replicating the data object based on the determined total number of storage nodes comprises replicating each of (i) the network flow of the data object and (ii) data of the data object based on the total number of storage nodes determined.

Example 65 includes the subject matter of any of Examples 60-64, and wherein receiving the data object to be replicated includes receiving an identifier for each of the storage nodes on which the data object is to be stored.

Example 66 includes the subject matter of any of Examples 60-65, and wherein receiving the data object to be replicated includes receiving a set of instructions, wherein the set of instructions includes one or more switch interface commands capable of being used by the switch to enable replication to each of the storage nodes.

Example 67 includes the subject matter of any of Examples 60-66, and further including receiving, by the switch and in response to transmitting one of the received data object or one of the replicated data objects, an acknowledgment from each of the storage nodes, wherein the acknowledgment indicates successful transmission of the data object from the switch to a corresponding one of the storage nodes.

Example 68 includes the subject matter of any of Examples 60-67, and further including transmitting, by the switch and in response to receiving the acknowledgment, the acknowledgment to the source endpoint node.

Example 69 includes a switch comprising a processor; and a memory having stored therein a plurality of instructions that when executed by the processor cause the switch to perform the method of any of Examples 60-68.

Example 70 includes one or more machine readable storage media comprising a plurality of instructions stored thereon that in response to being executed result in a switch performing the method of any of Examples 60-68.

Example 71 includes a switch for offloading data object replication, the switch comprising network communication circuitry to receive a data object to be replicated from a source endpoint node; storage node identification circuitry to (i) identify a network flow associated with the data object and (ii) determine a plurality of storage nodes at which the data object is to be stored based on the network flow, wherein each of the storage nodes is communicatively coupled to the switch; data object replication circuitry to replicate the data object a number of times based on a total number of the storage nodes; and computing node interfacing circuitry to transmit each one of the received data object and the replicated data objects to a corresponding one of the storage nodes.

Example 72 includes the subject matter of Example 71, and wherein to determine the storage nodes comprises to determine a main storage node and one or more replication storage nodes.

Example 73 includes the subject matter of any of Examples 71 and 72, and wherein to transmit the received data object and the replicated data objects to a corresponding one of the determined storage nodes comprises to (i) transmit the received data object to the main storage node and (ii) transmit one of the replicated data objects to a corresponding one of the replication storage nodes.

Example 74 includes the subject matter of any of Examples 71-73, and further including network packet modification circuitry to update a destination address for each of the replicated data objects based on a storage node of the storage nodes to which the replicated data object is to be transmitted.

Example 75 includes the subject matter of any of Examples 71-74, and wherein to replicate the data object based on the determined total number of storage nodes comprises to replicate each of (i) the network flow of the data object and (ii) data of the data object based on the total number of storage nodes determined.

Example 76 includes the subject matter of any of Examples 71-75, and wherein to receive the data object to be replicated includes to receive an identifier for each of the storage nodes on which the data object is to be stored.

Example 77 includes the subject matter of any of Examples 71-76, and wherein to receive the data object to be replicated includes to receive a set of instructions, wherein the set of instructions includes one or more switch interface commands capable of being used by the switch to enable replication to each of the storage nodes.

Example 78 includes the subject matter of any of Examples 71-77, and wherein the computing node interfacing circuitry is further to receive, in response to having transmitted the received data object and the replicated data objects, an acknowledgment from each of the storage nodes, and wherein the acknowledgment indicates successful transmission of the data object from the switch to a corresponding one of the storage nodes.

Example 79 includes the subject matter of any of Examples 71-78, and wherein the network communication circuitry is further to transmit, in response to having received the acknowledgment, the acknowledgment to the source endpoint node.

Example 80 includes a switch for offloading data object replication, the switch comprising network communication circuitry to receive a data object to be replicated from a source endpoint node; means for identifying a network flow associated with the data object; means for determining one or more storage nodes at which the data object is to be stored based on the network flow, wherein each of the storage nodes is communicatively coupled to the switch; and means for replicating the data object based on a determined total number of the storage nodes, wherein the network communication circuitry is further to transmit each one of the received data object and the replicated data objects to a corresponding one of the determined storage nodes.

Example 81 includes the subject matter of Example 80, and wherein the means for determining the storage nodes comprises means for determining a main storage node and one or more replication storage nodes.

Example 82 includes the subject matter of any of Examples 80 and 81, and wherein the means for transmitting the received data object and the replicated data objects to a corresponding one of the determined storage nodes comprises means for transmitting the received data object to the main storage node and transmitting one of the replicated data objects to a corresponding one of the replication storage nodes.

Example 83 includes the subject matter of any of Examples 80-82, and further including means for updating a destination address for each of the replicated data objects based on a storage node of the storage nodes to which the replicated data object is to be transmitted.

Example 84 includes the subject matter of any of Examples 80-83, and wherein the means for replicating the data object based on the determined total number of storage nodes comprises means for replicating each of (i) the network flow of the data object and (ii) data of the data object based on the total number of storage nodes determined.

Example 85 includes the subject matter of any of Examples 80-84, and wherein the means for receiving the data object to be replicated includes means for receiving an identifier for each of the storage nodes on which the data object is to be stored.

Example 86 includes the subject matter of any of Examples 80-85, and wherein the means for receiving the data object to be replicated includes means for receiving a set of instructions, wherein the set of instructions includes one or more switch interface commands capable of being used by the switch to enable replication to each of the storage nodes.

Example 87 includes the subject matter of any of Examples 80-86, and wherein the network communication circuitry is further to receive, in response to transmitting one of the received data object or one of the replicated data objects, an acknowledgment from each of the storage nodes, and wherein the acknowledgment indicates successful transmission of the data object from the switch to a corresponding one of the storage nodes.

Example 88 includes the subject matter of any of Examples 80-87, and wherein the network communication circuitry is further to transmit, in response to receiving the acknowledgment, the acknowledgment to the source endpoint node.

The invention claimed is:

1. One or more non-transitory, computer-readable storage media comprising a plurality of instructions stored thereon that in response to being executed cause a switch to:
receive a network packet from a source endpoint node communicatively coupled to the switch;
update metadata for the network packet, wherein the metadata is based on one or more of a plurality of service functions of a service function chain being executed at a computing node communicatively coupled to the switch and configured to process the network packet based on the metadata, and wherein to update the metadata comprises to store the metadata at a storage device of the switch and to provide an application programming interface to the next service function of the service function chain, wherein the application programming interface is usable to read the metadata stored at the switch;
forward, subsequent to having inserted the metadata into the network packet, the network packet to the service function;
receive, subsequent to having forwarded the network packet to the service function, feedback from the service function, wherein the feedback identifies a result of processing of the received network packet by the first service function;

modify, in response to having received the feedback from the first service function, the service function chain based on the feedback received from the first service function, wherein to modify the service function chain comprises to update the one or more of the plurality of service functions based on the feedback;

update, subsequent to having received the feedback, the metadata of the network packet based on the feedback received from the first service function and a next service function of the service function chain; and forward, subsequent to updating the metadata of the replicated network packet, the updated network packet to a next service function of the service function chain.

2. The one or more non-transitory, computer-readable storage media of claim 1, wherein the plurality of instructions further cause the switch to:

determine the plurality of service functions of the service function chain for the received network packet; and provide an indication to one or more computing nodes communicatively coupled to the switch, wherein the indication identifies a set of instructions usable by the one or more computing nodes to spin up and configure one or more virtual machines to execute at least a portion of the service functions of the service function chain.

3. The one or more non-transitory, computer-readable storage media of claim 2, wherein the plurality of instructions further cause the switch to:

determine an identifier of the network packet; and identify a policy corresponding to the identifier, wherein the set of instructions is usable by the one or more computing nodes to spin up and configure one or more virtual machines to execute at least a portion of the service functions of the service function chain is based on the identified policy.

4. The one or more non-transitory, computer-readable storage media of claim 3, wherein the identifier of the network packet comprises at least one of a workload type, a network flow, a source internet protocol address, a source port number, a destination internet protocol address, a destination port number, and a protocol of the network packet.

5. The one or more non-transitory, computer-readable storage media of claim 1, wherein the plurality of instructions further cause the switch to generate a replicated network packet from the network packet, wherein to insert the metadata into the network packet comprises to insert the metadata into the replicated network packet.

6. The one or more non-transitory, computer-readable storage media of claim 1, wherein the plurality of instructions further cause the switch to update, in response to having received the feedback from the first service function, one or more of the service functions based on the feedback received from the first service function.

7. The one or more non-transitory, computer-readable storage media of claim 1, wherein the plurality of instructions further cause the switch to (i) determine, subsequent to having received the feedback, whether another service function of the service function chain is available and (ii) forward, in response to a determination that the next service function chain is unavailable, the network packet to a destination computing node communicatively coupled to the switch.

8. The one or more non-transitory, computer-readable storage media of claim 1, wherein to update the metadata further comprises to insert the metadata into a header of the network packet.

9. The one or more non-transitory, computer-readable storage media of claim 1, wherein the plurality of instructions further cause the switch to determine an identifier of the network packet and identify a policy corresponding to the identifier, wherein to update the metadata of the network packet comprises to (i) determine the metadata based on the identified policy and (ii) insert the determined metadata into a header of the network packet.

10. A method for offloading service function chain management to a switch, the method comprising:

receiving, by a switch, a network packet from a source endpoint node communicatively coupled to the switch;

updating, by the switch, metadata for the network packet, wherein the metadata is based on a service function of a plurality of service functions of a service function chain being executed at a computing node communicatively coupled to the switch and configured to process the network packet based on the metadata, wherein updating the metadata for the network packet comprises storing the metadata at a storage device of the switch and providing an application programming interface to the next service function of the service function chain, wherein the application programming interface is usable to read the metadata stored at the switch;

forwarding, by the switch and subsequent to updating the metadata, the network packet to the service function;

receiving, by the switch and subsequent to forwarding the network packet to the service function, feedback from the service function, wherein the feedback identifies a result of processing of the network packet by a first service function;

modifying, in response to having received the feedback from the first service function, the service function chain based on the feedback received from the first service function, wherein to modify the service function chain comprises to update the one or more of the plurality of service functions based on the feedback;

updating, by the switch and subsequent to receiving the feedback, the metadata of the network packet based on the feedback received from the first service function and a next service function of the service function chain; and forwarding, by the switch and subsequent to updating the metadata of the replicated network packet, the updated replicated network packet to the next service function of the service function chain.

11. The method of claim 10, further comprising:

determining, by the switch, the plurality of service functions of the service function chain for the received network packet; and providing, by the switch, an indication to one or more computing nodes communicatively coupled to the switch, wherein the indication identifies a set of instructions usable by the one or more computing nodes to spin up and configure one or more virtual machines to execute at least a portion of the service functions of the service function chain.

12. The method of claim 11, further comprising:

determining, by the switch, an identifier of the network packet; and identifying, by the switch, a policy corresponding to the identifier, wherein the set of instructions is usable by the one or more computing nodes to spin up and configure the one or more virtual machines to execute at least a portion of the service functions of the service function chain based on the identified policy.

13. The method of claim 10, further comprising:
determining, by the switch and subsequent to receiving the feedback, whether another service function of the service function chain is available; and
forwarding, by the switch and in response to a determination that the next service function chain is unavailable, the network packet to a destination computing node communicatively coupled to the switch.

14. The method of claim 10, wherein updating the metadata further comprises inserting the metadata a header of the network packet to include the metadata.

15. A switch for offloading service function chain management, the switch comprising:
network communication circuitry to receive a network packet from a source endpoint node communicatively coupled to the switch;
means for updating metadata for the network packet, wherein the metadata is based on one or more of a plurality of service functions of a service function chain being executed at a computing node communicatively coupled to the switch and configured to process the network packet based on the metadata;
means for forwarding, subsequent to having inserted the metadata into the network packet, the network packet to the service function; and
means for receiving, subsequent to having forwarded the network packet to the service function, feedback from the service function, wherein the feedback identifies a result of processing of the received network packet by a first service function,
means for modifying, in response to having received the feedback from the first service function, the service function chain based on the feedback received from the first service function, wherein to modify the service function chain comprises to update the one or more of the plurality of service functions based on the feedback,
means for updating, subsequent to having received the feedback, the metadata of the network packet based on the feedback received from the first service function and a next service function of the service function chain, wherein the means for updating the metadata of the network packet comprises means for storing the metadata at a storage device of the switch and means for providing an application programming interface to the next service function of the service function chain, and
means for forwarding, subsequent to updating the metadata of the replicated network packet, the updated replicated network packet to the next service function of the service function chain.

16. The switch of claim 15, further comprising:
means for determining the plurality of service functions of the service function chain for the received network packet; and
means for providing an indication to one or more computing nodes communicatively coupled to the switch, wherein the indication identifies a set of instructions usable by the one or more computing nodes to spin up and configure one or more virtual machines to execute at least a portion of the service functions of the service function chain.

17. A switch for offloading service function chain management, the switch comprising:
one or more processors; and
one or more memory devices having stored therein a plurality of instructions that, when executed by the one or more processors, cause the switch to:
receive a network packet from a source endpoint node communicatively coupled to the switch;
update metadata for the network packet, wherein the metadata is based on one or more of a plurality of service functions of a service function chain being executed at a computing node communicatively coupled to the switch and configured to process the network packet based on the metadata;
forward, subsequent to having inserted the metadata into the network packet, the network packet to the service function;
receive, subsequent to having forwarded the network packet to the service function, feedback from the service function, wherein the feedback identifies a result of processing of the received network packet by the first service function;
modify, in response to having received the feedback from the first service function, the service function chain based on the feedback received from the first service function, wherein to modify the service function chain comprises to update the one or more of the plurality of service functions based on the feedback;
update, subsequent to having received the feedback, the metadata of the network packet based on the feedback received from the first service function and a next service function of the service function chain, wherein to update the metadata of the network packet comprises to store the metadata at a storage device of the switch and to provide an application programming interface to the next service function of the service function chain, wherein the application programming interface is usable to read the metadata stored at the switch; and
forward, subsequent to updating the metadata of the replicated network packet, the updated network packet to a next service function of the service function chain.

18. The switch of claim 17, wherein the plurality of instructions further cause the switch to:
determine the plurality of service functions of the service function chain for the received network packet; and
provide an indication to one or more computing nodes communicatively coupled to the switch, wherein the indication identifies a set of instructions usable by the one or more computing nodes to spin up and configure one or more virtual machines to execute at least a portion of the service functions of the service function chain.

19. The switch of claim 18, wherein the plurality of instructions further cause the switch to:
determine an identifier of the network packet; and
identify a policy corresponding to the identifier,
wherein the set of instructions is usable by the one or more computing nodes to spin up and configure the one or more virtual machines to execute at least a portion of the service functions of the service function chain based on the identified policy.

20. The switch of claim 17, wherein the plurality of instructions further cause the switch to generate a replicated network packet from the network packet, wherein to insert the metadata into the network packet comprises to insert the metadata into the replicated network packet.

21. The switch of claim 17, wherein the plurality of instructions further cause the switch to:

determine, subsequent to having received the feedback, whether another service function of the service function chain is available; and forward, in response to a determination that the next service function chain is unavailable, the network packet to a destination computing node communicatively coupled to the switch.

22. The switch of claim 17, wherein to update the metadata further comprises to insert the metadata a header of the network packet to include the metadata.

23. The switch of claim 17, wherein the plurality of instructions further cause the switch to:

determine an identifier of the network packet; and identify a policy corresponding to the identifier.

24. The switch of claim 23, wherein to update the metadata of the network packet comprises to (i) determine the metadata based on the identified policy and (ii) insert the determined metadata into a header of the network packet, and wherein the identifier comprises one or more of a workload type, a network flow, a source internet protocol address, a source port number, a destination internet protocol address, a destination port number, and a protocol of the network packet.

\* \* \* \* \*